(12) United States Patent
Lane et al.

(10) Patent No.: US 6,681,579 B2
(45) Date of Patent: Jan. 27, 2004

(54) AIR TURBINE STARTER WITH FLUID FLOW CONTROL

(75) Inventors: Glenn H. Lane, Chandler, AZ (US); Gary A. Farnsworth, Mesa, AZ (US); Gerhard Schroeder, Phoenix, AZ (US); Kellan Geck, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/071,175

(22) Filed: Feb. 7, 2002

(65) Prior Publication Data

US 2003/0145602 A1 Aug. 7, 2003

(51) Int. Cl.[7] .......................... F02C 7/277; F16K 17/30
(52) U.S. Cl. .................. 60/787; 60/778; 60/39.091; 60/788
(58) Field of Search .................. 60/788, 787, 778, 60/39.091

(56) References Cited

U.S. PATENT DOCUMENTS

| | | |
|---|---|---|
| 4,046,222 A | 9/1977 | Skrivanek et al. ......... 184/6.11 |
| 4,077,202 A | 3/1978 | Schutze ........................ 60/788 |
| 4,100,935 A | 7/1978 | Harnish |
| 4,383,549 A | 5/1983 | Maldavs |
| 4,605,039 A | 8/1986 | Johnson et al. |
| 4,779,413 A | 10/1988 | Mouton ..................... 60/39.08 |
| 4,960,085 A | 10/1990 | Coons |
| 5,042,963 A | 8/1991 | Sorenson et al. ............. 415/18 |
| 5,235,812 A | 8/1993 | Klaass et al. ................. 60/727 |
| 5,462,081 A | 10/1995 | Perusek et al. |
| 5,636,848 A * | 6/1997 | Hager et al. ................ 277/420 |
| 5,911,678 A * | 6/1999 | White ......................... 60/787 |
| 5,941,532 A | 8/1999 | Flaherty et al. ............. 277/400 |
| 5,979,488 A | 11/1999 | Smith et al. |
| 6,004,037 A | 12/1999 | Harris et al. ................ 384/206 |

FOREIGN PATENT DOCUMENTS

| | | |
|---|---|---|
| GB | 2 144 804 | 3/1985 |
| WO | WO 99/40351 | 8/1999 |
| WO | PCT/US03/03515 | 7/2003 |

* cited by examiner

Primary Examiner—Sheldon J. Richter
(74) Attorney, Agent, or Firm—Robert Desmond, Esq.

(57) ABSTRACT

An improved air turbine starter that includes fluid flow control devices. The devices may be check valves, for example normally open check valves. The check valves may be located in fluid flow paths between the starter and the gearbox to which it is mounted. The starter may also include a ring seal about the output shaft to restrict fluid flow over the shaft.

36 Claims, 6 Drawing Sheets

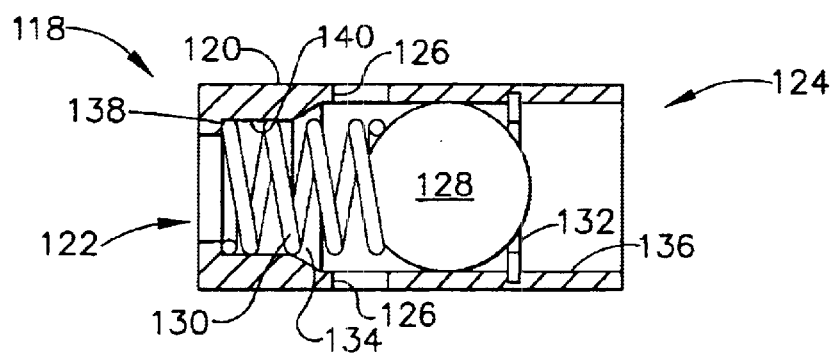
FIG. 4
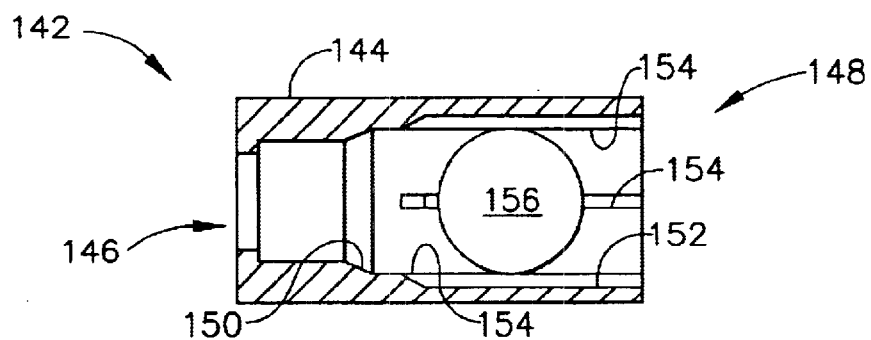
FIG. 5
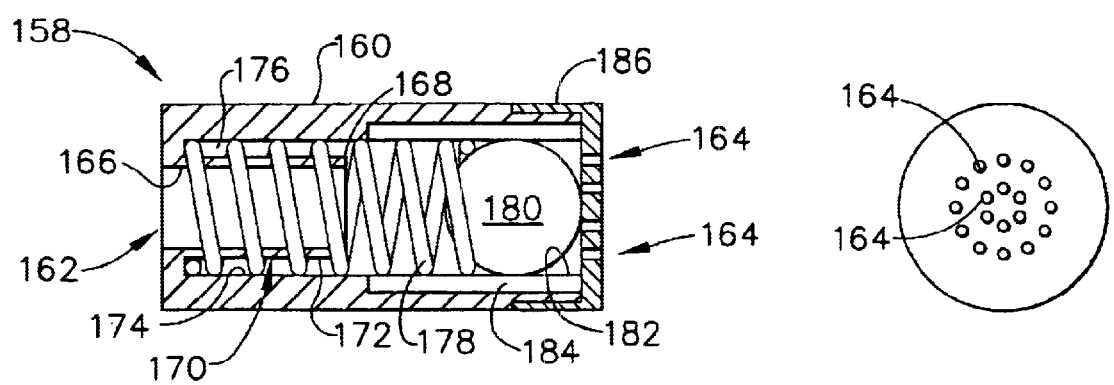
FIG. 6
FIG. 7 ns inventions relate generally to turbines and have
AIR TURBINE STARTER WITH FLUID FLOW CONTROL

TECHNICAL FIELD

These inventions relate generally to turbines and have particular application to air turbine starters and to valves used in such starters. Such devices can be used, for example, in starting systems for gas turbine engines commonly found on aircraft.

BACKGROUND OF THE INVENTIONS

An air turbine starter ("ATS") is a device used to start a turbine engine, such as a gas turbine jet engine. The air turbine starter is used to start the jet engine, much as a starter for an automobile is used to start the automobile's engine. In order to start the jet engine, the air turbine starter is activated. The developer of the present inventions, Honeywell International, Inc., has for years successfully designed, developed and manufactured air turbine starters.

Air turbine starters A (FIG. 9) are typically mounted to the jet engine B through a gearbox C or other transmission assembly with a cover plate or wall D between the starter housing and the gearbox housing. The transmission transfers power from the starter to the jet engine to assist in starting jet engine. The transmission may also transmit power from the jet engine to other components linked to the transmission.

Some air turbine starters are lubricated in part using an assisted wet cavity design (AWC). In such a design, the turbine starter housing includes a mounting face or mounting flange which sealingly engages the gearbox, joining in such a way as to define a porting system, which allows free transfer of lubricating oil and air between the gearbox and starter. The oil port is in fluid communication with internal passages within the starter housing for distribution of the lubricating oil it has acquired. The air passage prevents a vapor lock that would prevent oil transfer. The oil port is located such that it acts as a sump passage or oil return passage and allows free flow of the oil between the starter and the gearbox.

Air flow between air turbine starters and the gearboxes to which they are attached is generally unrestricted. The gearbox and air turbine starter are typically pressurized two to four psi above atmospheric pressure. Generally, air turbine starters are very safe and reliable. However, under certain circumstances, the starter housing may be inadvertently punctured from the outside or from the inside. Under this type of failure mode, air will flow from the pressurized starter gearbox, through the puncture to the nacelle which is at two to four psi lower pressure. Because the air from the gearbox includes a substantial amount of oil entrained within it, this may result in reduced oil in the gearbox. If the air flow out of the gearbox and out of the starter is large enough, there may be enough oil loss from the gearbox to cause an unplanned engine shutdown.

Preferably, the starter and gearbox can exchange fluid under normal operations, and limit or control fluid flow from the starter and gearbox to the nacelle under failure conditions that result in a wall puncture. Thus, there is a need for an improved air turbine starter with fluid flow control. The present inventions fulfill this need.

SUMMARY OF THE INVENTIONS

The present inventions provide an improved turbine assembly and improved method of operating a turbine assembly, and they provide an improved interface between a turbine and equipment to which it may be mounted, such as may be used with an air turbine starter or with other turbine applications. One or more aspects of the inventions can be used to reduce the possibility of loss of lubricating oil after ATS puncture. In one aspect of one of the present inventions, components of conventional turbine assemblies can be replaced with improved components for controlling fluid loss from a turbine when a puncture type failure has occurred.

In accordance with one aspect of one of the present inventions, a gas turbine engine combination, such as a gas turbine jet engine, including a jet engine, gearbox and air turbine starter are configured so that a cover plate for the air turbine starter includes at least one passageway and a valve in the at least one passageway for influencing, regulating or controlling fluid flow between the gearbox and the air turbine starter after failure occurs. In one form of one of the inventions, the valve is a normally open valve which closes when the air pressure differential between the ATS and the gearbox increases more than desired. In another form of one of the present inventions, the air turbine starter includes two normally open valves for regulating the pressure differential between the air turbine starter and the gearbox. Preferably, each opening between the air turbine starter and the gearbox allowing air flow between them includes a regulating element for regulating and even shutting off air flow from the gearbox into the air turbine starter when an excessive pressure drop is sensed from the gearbox to the starter. For example, a ring seal can also be included around the output shaft of the air turbine starter to limit excessive air flow from the gearbox to the starter.

In accordance with another aspect of one of the present inventions, an air turbine starter includes a plate or wall engaging part of a housing on the air turbine starter and a valve. The valve may be a normally open valve and preferably allows free-flow of fluid such as oil and air between the ATS and gearbox under normal conditions and limits or eliminates flow from the gearbox to the starter under failure conditions. In one embodiment, the valve is placed in an opening in the wall, such as the opening that vents the starter gearbox and allows the starter to be serviced with oil. In another embodiment, the valve is placed in a passageway extending through another opening in the wall, such as that used for allowing excess oil to drain from the starter back into the gearbox. In accordance with a further aspect of one of the present inventions, an air turbine starter includes a plate or wall engaging part of the housing on the air turbine starter and a normally open valve. The valve is preferably placed on a portion of the air turbine starter adjacent a gearbox to which the starter is mounted. In one form of the inventions, the valve is placed in an opening that allows excess oil to drain from the starter back into the accessory gearbox. In another form of the inventions, the valve is placed in an opening that vents the starter and gearbox and allows the starter to be serviced with oil. In one form of one of the inventions, the valve includes a plastic stopper, and in another form includes a glass or ceramic stopper. The stopper may be spring biased open. The valve may include a housing having a perforated end wall and/or a perforated side wall.

In another form of one of the present inventions, a kit may be assembled for configuring an air turbine starter to include a valve, wherein the kit includes a cover plate having an opening and a normally open valve for engaging the opening in the cover. In one embodiment, the cover plate includes an engagement surface and the valve includes a complementary engagement surface so that the valve is normally open with a slight pressure differential in the air turbine starter lower than the pressure in the gearbox, and so that the valve is closed when the differential is too high. In one form of the kit, the cover plate includes a ring seal for sealing about an output shaft.

In a further form of one of the present inventions, a method is provided for operating an air turbine starter including allowing air transfer between the air turbine starter and the gearbox. A fluid valve is maintained open under normal operating pressures inside the air turbine housing and closes when the differential pressure between the gearbox and ATS increases above a defined pressure. Such operation may minimize undesirable fluid flow into the air turbine housing, also preferably minimizing the net amount of lubricating oil that flows into the air turbine starter.

These and other features and advantages of the present inventions are set forth in the following detailed description of a preferred embodiments when read in conjunction with the accompanying drawings.

BRIEF DESCRIPTION OF THE DRAWINGS

FIG. 4 is a partial longitudinal transverse cross-section of a valve for use with an air turbine starter in accordance with one aspect of one of the present inventions.

FIG. 5 is a partial longitudinal transverse cross-section of a further valve for use with an air turbine starter in accordance with another aspect of one of the present inventions.

FIG. 6 is a partial longitudinal transverse cross-section of another valve for use with an air turbine starter in accordance with another aspect of one of the present inventions.

FIG. 7 is an elevation end view of the valve of FIG. 6.

DESCRIPTION OF THE PREFERRED EMBODIMENTS

Figure 1:
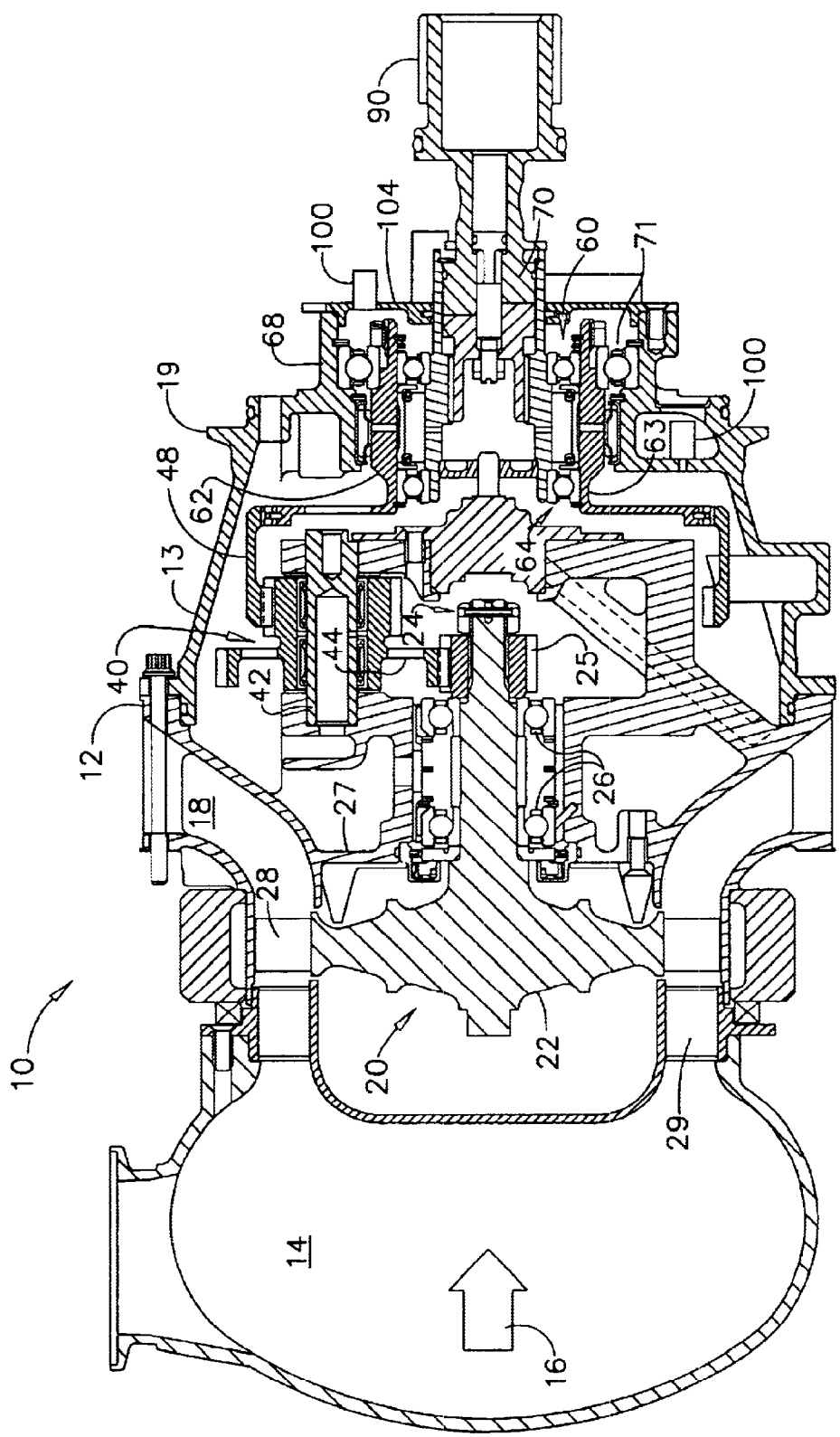
FIG. 1 is a longitudinal transverse cross-section of a portion of an air turbine starter in accordance with one aspect of one of the present inventions.

Apparatus and methods are described for regulating fluid flow between a turbine and a transmission system, such as between an air turbine starter and a gearbox. Conventional air turbine starters and gearboxes, for example those that utilize an assisted wet cavity, can be modified by incorporating one or more fluid flow control devices, for example check valves, between the air turbine starter and the gearbox. While the embodiments described herein are directed to air turbine starters and gearboxes to which they may be mounted, it should be understood that other turbine and transmission combinations may also be modified to include one or more of the structures described herein. Additionally, while the embodiments described herein are directed to adding control devices to the air turbine starter, for example in the area of the air turbine starter adjacent to gearbox, it should be understood that such control devices can be included in various areas forming fluid flow paths between the starter and the gearbox. Moreover, such control devices can be incorporated into gearboxes in addition to or instead of the starter and achieve functions similar to one or more of those described herein.

The air turbine starter 10 (FIG. 1) has a first housing assembly 12 and a second housing assembly 13. The housing assembly 12 defines a flow path 14 extending from an inlet 16 to an outlet 18. The housing assembly 13 includes a mounting flange 19 for mounting the air turbine starter to a gas turbine engine (not shown). An air pressure duct delivers pressurized air from an air supply to the inlet 16. Typically, the air pressure at the inlet 16 is in the range of 30–40 psig.

Within the air turbine starter 10, the housing assemblies 12 and 13 support a turbine section 20, a compound planetary gear train 40, and an overrunning clutch 60.

The turbine section 20 is comprised of a turbine wheel 22 having a rotatable shaft 24 extending therefrom, journaled by bearings 26 to a turbine exhaust housing 27, which is part of housing 12. A gear 25 is secured to the shaft 24. A plurality of turbine blades 28 are circumferentially mounted to the turbine wheel 22 and are positioned within the flow path 14. Upstream of the blades 28 are a plurality of nozzles 29 mounted to the inlet 16 which provide the proper flow angle to the air flow before it enters the turbine blades 28. In operation, pressurized air entering through inlet 16 is properly aligned by the nozzles 29 and is then expanded across the blades 28 before exiting through outlet 18. The blades 28 convert the pressure energy of the air into rotary motion causing the turbine wheel 22, the shaft 24 and the gear 25 to rotate at the same speed as the blades 28.

The compound planetary gear train 40 is comprised of a plurality of shafts 42 each having a gear 44 that meshes with the gear 25. The gear 44 is supported by shaft 42, a ring gear 48 and a hub gear 62, which is the input side of the overrunning clutch 60. In operation, the gear train 40 converts the high speed, low torque output of the turbine section 20 into low speed, high torque input for the clutch 60.

The clutch 60 is a sprag type clutch, although other clutch mechanisms may be used. The clutch 60 has the hub gear 62 on its input side and a clutch drive shaft 70 on its output side. The hub gear 62 has a hollow cylindrical hub portion 63, which is supported on a bearing 64. Inside the hubgear, an inner race is supported by bearings 64. An output shaft decoupler assembly 90 is splined into the inner race. The output shaft 90 can be coupled, for example, to a starter pad on the gearbox of a gas turbine engine.

Figure 9:
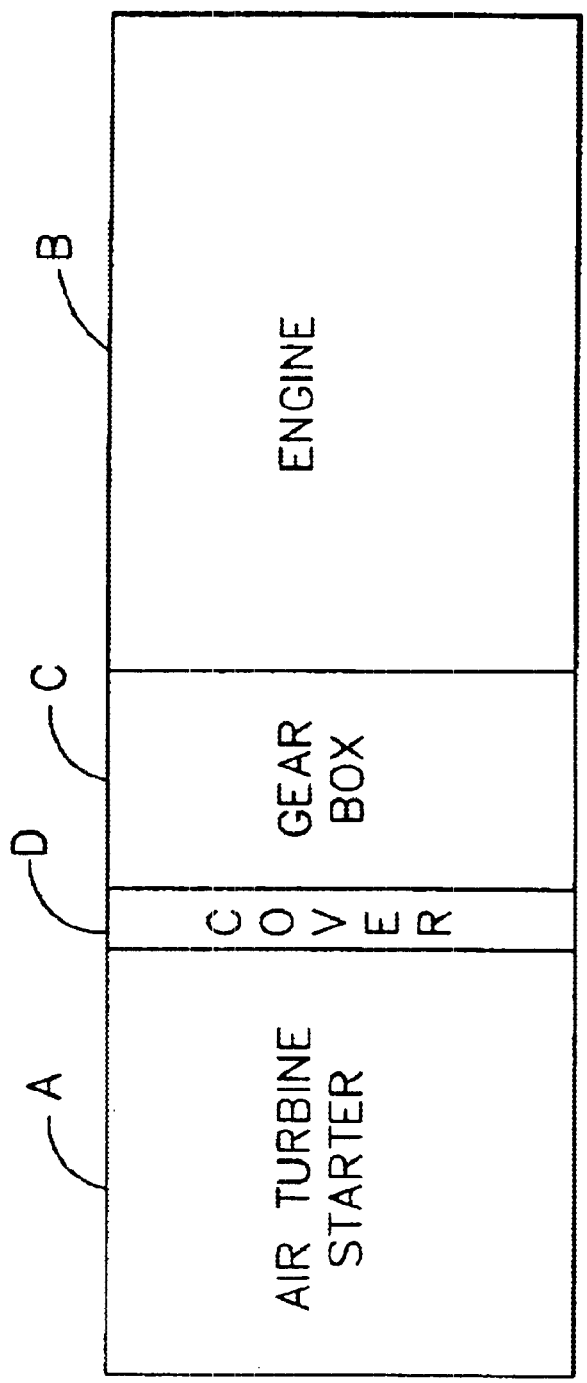
FIG. 9 is a schematic representation of a jet engine, gearbox and air turbine starter for one aspect of one of the present inventions.

Considering one example of the present apparatus, the air turbine starter 10 includes one or more fluid flow valves, designated generally in FIG. 1 as 100. The valves 100 control fluid flow, for example airflow, between the air turbine starter and the gearbox C (FIG. 9). In the context of an air turbine starter and a conventional gearbox C, the fluid flow between the air turbine starter and the gearbox may also include lubricating oil, for example entrained in the air, as oil droplets or liquid flow of oil. The valves 100 are preferably pressure valves, normally open under normal operating conditions for the starter and the gearbox. The valves 100 operate according to a pressure differential existing between the interior of the gearbox, primarily that portion of the gearbox exposed to oil-bearing surfaces, and the interior of the air starter turbine, such as within the starter housing 12 and 13, primarily those interior channels through which oil flows. When the pressure in the air turbine starter drops, for example due to a loss of fluid through a puncture in the ATS wall, the pressure differential between the ATS and gearbox increases beyond a predetermined level. For example when the fluid pressure within the air turbine starter housing decreases significantly below the fluid pressure within the gearbox, at least one and preferably each of the valves 100 close, preferably completely, to reduce fluid flow from the gearbox to the starter. In the preferred embodiment, the valves 100 are configured so that fluid flow from the gearbox to the starter through the valves is stopped when the pressure differential increases beyond the predetermined level.

Figure 2:
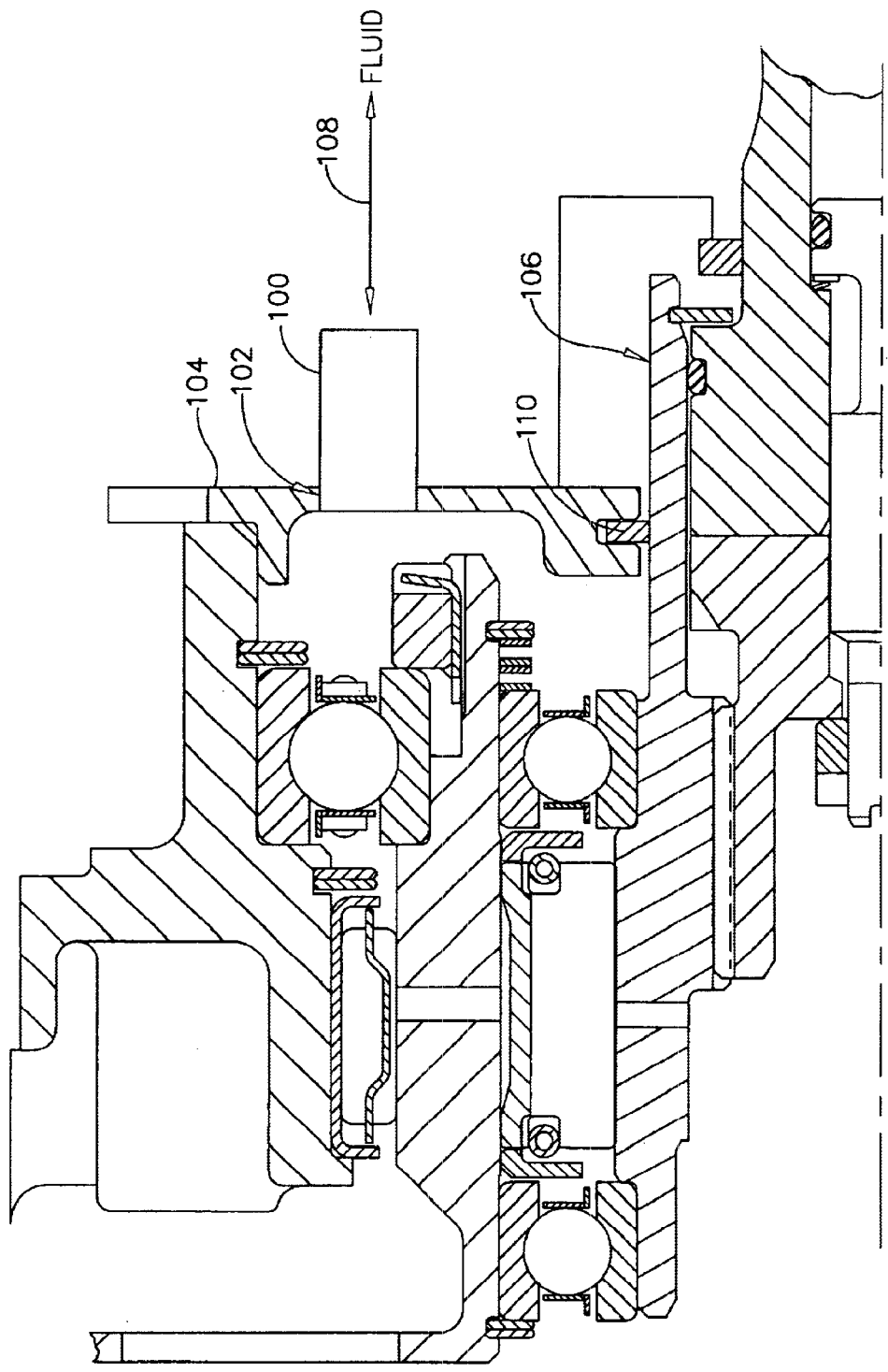
FIG. 2 is a detail and cutaway of a portion of the starter of FIG. 1 showing a valve and a portion of a cover plate for an air turbine starter accordance with one aspect of one of the present inventions.

A valve 100 may be placed within or adjacent an opening in the starter housing, for example between the air turbine starter and the gearbox. The valve 100 may be placed within or over an opening 102 in a wall or cover plate 104 (FIG. 2), which is mounted to the starter housing and about the inner race 106 of the starter. The cover plate forms, for present purposes, part of the housing, and serves to cover part of the air turbine starter components. The opening 102 in this aspect of the starter vents between the starter and the gearbox and allows the starter to be serviced with oil. The opening 102 may be the conventional opening modified to preferably close around and accept the valve 100, or the cover plate 104 may be reconfigured to include the valve 100 as desired while eliminating or reducing the conventional opening. The cover plate can be formed with the valve body or housing integral with the cover plate, and the internal valve components added later. Alternatively, the opening in the cover plate can be configured to receive the complete valve assembly, such as through threaded engagement, bayonet mount, or other mounting methods. The mounting configuration is preferably such as to ensure proper valve orientation for proper operation. The valve is normally open and designed to close at a relatively low pressure drop in the direction to the left for arrow 108 of air flow from the gearbox into the starter. Therefore, the starter can operate in the conventional mode, but if the air pressure in the starter drops too much below the air pressure in the gearbox, the valve can close, preferably completely, thereby restricting the amount of fluid that can flow from the gearbox into the starter, and also restricting oil loss from the gearbox.

The cover plate 104 also preferably includes a ring seal 110. The ring seal seals around the inner race 106 and reduces the amount fluid flow, including air and oil, along the shaft and between the gearbox and the starter. The ring seal 110 helps to minimize the amount of fluid flow between the gearbox and the starter if the valves 100 close. The ring seal 110 helps to minimize fluid flow even if the pressure differential between the gearbox and the starter increases. Other seals may also be used to minimize fluid flow along the shaft.

Figure 3:
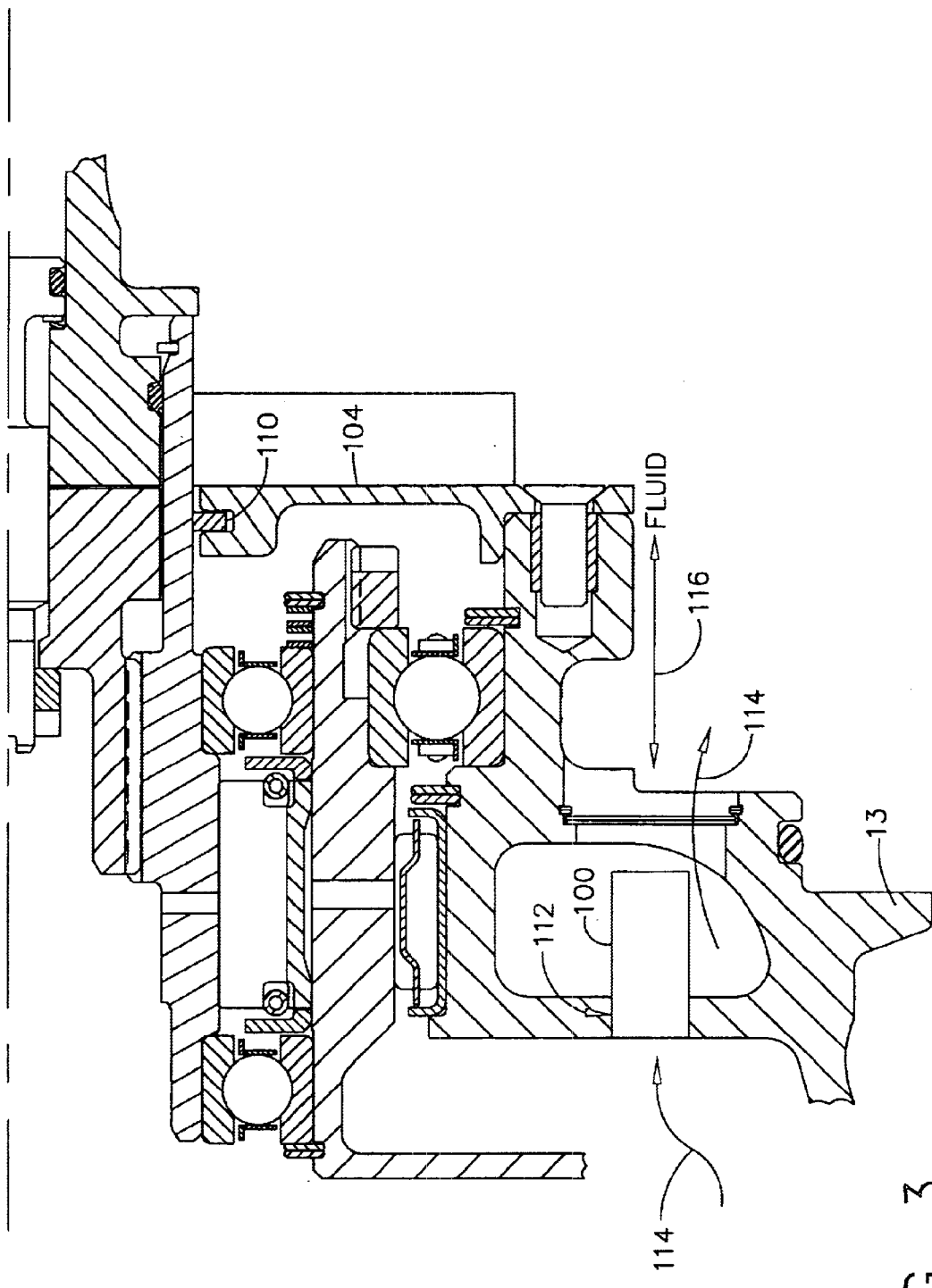
FIG. 3 is a detail and cutaway of a portion of the starter of FIG. 1 showing a valve and a portion of a cover plate in accordance with another aspect of one of the present inventions.

In another example of the apparatus, a valve 100 is placed adjacent, within or over an opening 112 of the starter (FIG. 3). The opening 112 is part of a passageway 114 that allows oil to pass between the starter and the gearbox. The passageway 114 is conventional in assisted wet cavity starter designs and is formed in the housing 13. The opening 112 may be the conventional opening modified to close around and accept the valve 100, or the housing 13 may be reconfigured to include surfaces for receiving or mounting the valve 100 and eliminating or reconfiguring the conventional opening 112. This valve 100 is preferably identical to the valve 100 for the mounting plate 104 and closes at a relatively low pressure drop in the direction to the left for arrow 116 of fluid flow from the gearbox into the starter. The starter can operate in the conventional mode, but if air pressure in the starter drops too much below the air pressure in the gearbox, the valve can close, preferably completely, thereby restricting the amount of fluid that can flow from the gearbox into the starter, and also restricting oil loss from the gearbox.

The valves 100 can take any number of configurations, several of which are shown in FIGS. 4–7. Any of these valves, as well as others including poppet and flapper valves, can be used as valves 100 in the starter. In one example, valve 118 is a check valve that includes a valve housing 120 having a first opening 122 and a second opening 124. The first opening would be positioned closer to the air turbine and the second opening would be positioned closer to the gearbox side of the combination of the air turbine and gearbox. With a lower air pressure in the starter relative to the gearbox, fluid flows out of the valve through the first opening 122. Fluid flows into the check valve through one or more perforations 126 formed in the circumferential sides of the housing 120, the outside of the housing preferably forming a right circular cylinder. Additional perforations 126 may be included in the housing as desired.

A valve ball 128 is biased away from the first opening 122 by a spring or other bias element 130. The spring 130 holds the ball 128 against a retaining element 132 and against the higher air pressure from the gearbox. As the pressure differential from the second opening 124 to the first opening 122 increases sufficient to overcome the force of the spring 130, the ball 128 is forced against a valve seat 134, which may be formed as a counter sunk surface at the end of the bore 136 extending from the second opening 124 past the perforations 126. The spring 130 rests against a restriction wall 138 at the end of a counter bore 140 between the valve seat 134 and the first opening 122.

The valve 118, as with any of the valves described herein, will include surfaces or other elements (not shown) for mounting or engaging the valve with a corresponding surface on the starter. Such surfaces may include threads, locks, snap rings or other engagement elements. Each of the valves may also include engagement surfaces or other directional devices to ensure that the valve is oriented properly in the starter.

In another example, valve 142 (FIG. 5) is a check valve having a preferably cylindrical valve housing 144 and the first opening 146 in the housing and a second opening 148 preferably opposite the first opening 146. The construction of the valve 142 is similar to the valve 118 but omitting a bias spring and omitting the side perforations. The valve includes a valve seat 150 at the end of bore 152. The bore 152 includes preferably four or more lands or rails 154 defining a smallest diameter for the bore and along which ball 156 can move. The lands can include end portions (not shown) further raised from the bore 152 for keeping the ball 156 within the bore, or an end cap such as that described below can be used to retain the ball in the bore. When the pressure differential between the gearbox and the starter increases to the selected level, the ball 156 will be moved against the valve seat 150, closing the valve.

A further example of a valve includes a check valve 158 (FIG. 6) having a preferably cylindrical valve housing 160 and a first opening 162 and one or more second openings 164 at an end of the housing opposite the first opening 162. A first bore 166 extends into the interior from the first opening 162 to a valve seat 168 formed at the end of a cylindrical sleeve 170. The sleeve 170 defines the first bore 166 and has a wall 172 spaced from the wall 174 of a bore 176 receiving a bias spring 178. The spring 178 biases ball 180 outward away from the valve seat 168 and toward the openings 164. The ball 180 is supported by preferably at least two and more preferably at least four lands 182 formed by corresponding arcuate grooves 184 formed into the wall of bore 176. Fluid passes between the openings 164 and 162 through the grooves 184 and around ball 180 during normal operation. The openings 164 are preferably formed in an end cap 186 over the end of the housing 160. The openings 164 are preferably in the form of circular openings arranged in a circle. In one preferred embodiment, the openings are arranged into concentric circles. When the pressure differential increases as pressure in the starter drops, the ball 180 moves toward and seats against the valve seat 168, closing the check valve.

In one example for the valve shown in FIGS. 6–7, the valve is preferably configured to go fully closed between 0.1 pounds per square inch differential (psid) and 2.0 psid, as desired. One preferred pressure for conventional air turbine starters with assisted wet cavity designs is approximately 0.5 psid, or about a minimum closing pressure for the bottom valve of preferably at least 12 inches of water. At least 12 inches of water is preferred in order to keep the lower valve open during normal operation, such as when there is a head of oil on it in the passageway 114, including a head of oil from the accessory gearbox side.

Where the valve is a poppet valve, a low weight poppet for check valves allows a relatively low closing pressure while still having sufficient spring force to minimize the possibility that normal vibration levels will unseat the poppet. The poppet would preferably be made or formed from aluminum or other light weight material, for example. The poppet may be inserted within and biased by a spring, which itself may be inserted within the housing so that the spring is nested between a wall of the housing on the outside and a wall of the poppet in the inside. The poppet may have a hollow bullet shape with the nose formed to seat against the valve seat, and the tail having a rim or other spring engagement portion allowing the spring to bias the poppet away from the valve seat. While normally open, fluid flows between an opening in the tail of the poppet and lateral openings in the wall of the poppet, where the openings are positioned between the nose and the portion of the poppet surrounded by the spring. The housing of the check valve is preferably plastic or aluminum.

In one example for a ball valve, the ball 180 is preferably made from a light, hard material such as silicone nitride ceramic. Other characteristics of a possible valve include:

| | |
|---|---|
| Seat Dia (in.) | 0.5000 |
| Seat Area (in.$^2$) | 0.1963 |
| Ball Dia (in.) | 0.7500 |
| Ball Volume (in.$^3$) | 0.2209 |
| Ball Density (lb./in.$^3$) | 0.1150 |
| Ball Weight (lb.) | 0.0254 |
| Spring big diameter (in.) | 0.6375 |
| Wire Diameter (in.) | 0.0200 |
| No. of Active Coils | 7.0000 |
| Torsional Modulus (G) (psi) | 11000000 |
| Spring Rate (lb./in.) | 0.1213 |
| Compressed Load at full open (.5") | 0.0607 |
| Compressed Load at full closed | 0.0970 |

-continued

| | |
|---|---|
| (.8") | |
| G Force | 2.0000 |
| Equivalent Ball Load (preferably less than "compressed load at full open") | 0.0508 |
| C (D/d) | 31.8750 |
| KW1 Stress Correction Factor | 1.0436 |
| Stress (psi) | 20550.9764 |
| Pressure to get to full closed (psid) | 0.4942 |

It should be understood that a significant number of valve designs can be incorporated into the air turbine starter. The valves described with respect to the drawings are several examples. Other examples include poppet valves, flapper valves, and the like. Additionally, valves having the same or having different configurations and characteristics can be used in the same assembly, including different valves in the same air turbine starter, for example. For purposes of illustration, it is noted that the valve in the passageway 114 typically would be exposed to more liquid than the valve for the vent opening 102 on the other side of the output shaft (as shown in the drawings), and therefore it would preferably have a higher pressure threshold than the valve in the vent opening 102. A higher pressure threshold could be used to account for the head of oil to which it is exposed. The valve in the vent 102, or in any other location exposed to lower liquid amounts, can be configured to be identical to the valve in the passageway 114, for simplicity, but it can also be configured to have a different design and properties. For example, the valve in the vent opening 102 could be formed by incorporating the valve housing into the cover 104, such as by molding, and a spring and closure member installed into the molded housing. Additionally, the valve in the vent opening 102 could be configured with a threshold lower, such as 0.1 psid or between 0.1 and 0.5 psid, than the valve in the passageway 114, because it would normally not be exposed to the head of oil to which the valve in the passageway 114 is exposed.

It should also be understood that these valves can be incorporated into other structures than the air turbine starter, for example the gearbox, instead of or in addition to the air turbine starter. For example, normally open valves can be incorporated into the gearbox design to limit excessive fluid flow from the gearbox into the oil service opening in the air turbine starter and/or into the opening for the oil return, and/or into any intervening structures. One configuration includes supporting the valves with the gearbox while having the valves seal or otherwise engage the corresponding openings in the air turbine starter once the starter is mounted to the gearbox.

Figure 8:
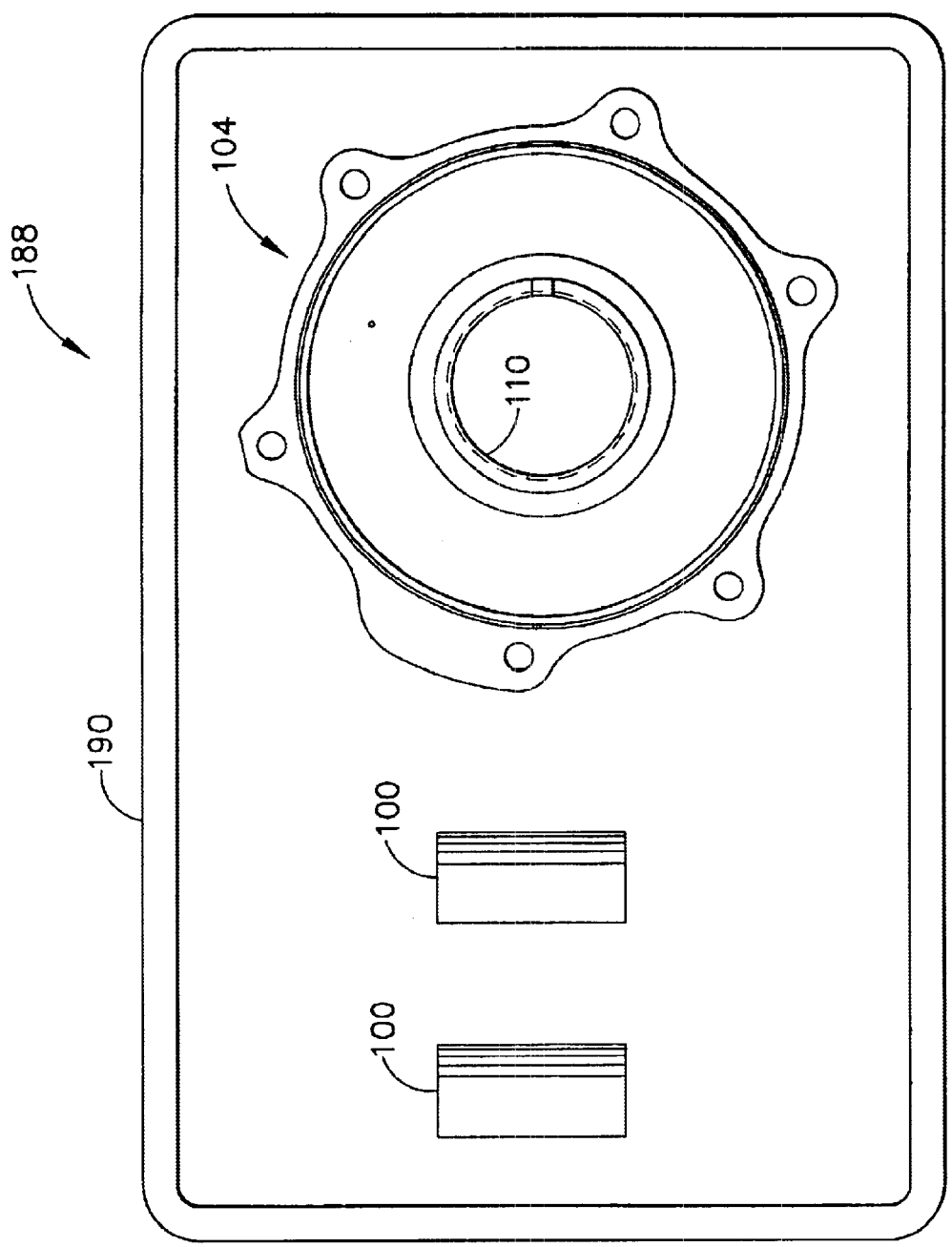
FIG. 8 is a top plan view of a kit for retrofitting existing air turbine starters including a cover plate and valves, in accordance with another aspect of one of the present inventions.

In yet another aspect, conventional air turbine starters can be rebuilt, and new air turbine starters can be built incorporating one or more aspects described herein, such as the turbine starter incorporating the valves and ring seal described herein using a kit 188 (FIG. 8). In a preferred embodiment, the kit will include the cover plate 104 having the ring seal 110. Valves 100 are included to be installed with the plate or in the housing 13, as necessary. The kit will also preferably include appropriate other components necessary to install the cover plate and valves in an air turbine starter in a manner determined by the particular design of the turbine starter, and such additional components may include seal assemblies and the like. The kit may include an appropriate container 190 for shipping, storage or for other purposes.

Various modifications and alterations to the above-described preferred embodiments will be apparent to those skilled in the art. For example, the present apparatus can be used with other gas turbine engine configurations. Accordingly, these descriptions of the inventions should be considered exemplary and not as limiting the scope and spirit of the inventions.

What is claimed is:

1. A gas turbine engine combination comprising:
   an air turbine starter including a cover plate and at least one passageway through the cover plate;
   a gas turbine engine;
   a gearbox adjacent the cover plate and between the air turbine starter and the gas turbine engine; and
   a normally open valve in the at least one passageway through the cover plate.

2. The combination of claim 1 wherein the normally open valve is positioned in an oil return passage between the starter and the gearbox.

3. The combination of claim 1 wherein the valve includes a spring biased ball.

4. The combination of claim 1 wherein the valve includes a valve housing having a valve seat formed by a chamfer surface.

5. The combination of claim 1 wherein the first valve includes a valve ball within a valve housing having internal lands and grooves.

6. The combination of claim 5 wherein the first valve housing includes a chamfer surface forming a valve seat.

7. The combination of claim 1 further comprising a second normally open valve between the gearbox and the air turbine starter.

8. The combination of claim 7 wherein the second valve is positioned in a vent hole between the starter and the gearbox.

9. The combination of claim 8 wherein the first-recited valve is positioned in an oil return passage between the starter and the gearbox.

10. The combination of claim 1 wherein the valve includes a spring biased ball and a retaining element.

11. The combination of claim 10 wherein the retaining element includes a perforated wall.

12. The combination of claim 10 wherein the retaining element includes an annulus.

13. The combination of claim 12 wherein the valve includes a housing having a housing wall surrounding the ball wherein the housing wall includes at least one wall defining an opening.

14. An air turbine starter comprising:
    an air turbine starter housing;
    an output shaft extending from the air turbine starter housing;
    a wall adjacent the turbine output shaft; and
    a pressure valve in at least one of the air turbine starter housing and the wall wherein the valve is normally open under normal operating conditions for the turbine housing.

15. The air turbine starter of claim 14 wherein the air turbine starter has a normal internal operating pressure and the valve is configured to close when the internal operating pressure decreases below a given pressure.

16. The air turbine starter of claim 14 wherein the valve includes a plastic stopper.

17. The air turbine starter of claim 14 wherein the air turbine starter housing includes an oil return channel and wherein the valve is positioned adjacent the oil return channel.

18. The air turbine starter of claim 14 wherein the turbine housing includes an oil vent between the air turbine starter housing and a transmission housing and wherein the valve is positioned adjacent the oil vent.

19. The air turbine starter of claim 14 wherein the valve includes a spring biased ball.

20. The air turbine starter of claim 14 wherein the valve includes a valve housing having a perforated end wall.

21. The air turbine starter of claim 14 wherein the valve includes a valve housing having a perforated side wall.

22. The air turbine starter of claim 14 wherein the valve is placed in the housing of the air turbine starter.

23. The air turbine starter of claim 22 wherein the valve is placed in the a rear portion of the air turbine starter.

24. The air turbine starter of claim 23 wherein the valve is placed in the housing adjacent the a transmission housing.

25. The air turbine starter of claim 14 wherein the valve is normally biased open.

26. The air turbine starter of claim 25 wherein the valve includes a bias element having a threshold for closing the valve and wherein the threshold is at least about 12 inches of water.

27. The air turbine starter of claim 26 wherein the valve is positioned in an oil return channel of the air turbine starter and wherein the valve is a poppet valve.

28. A kit for configuring an air turbine starter to have a valve, the kit comprising:
    a cover plate for mounting on an air turbine starter between the air turbine starter and a gearbox, the cover plate having a wall defining an opening for receiving a valve, the cover plate further including an engagement surface; and
    a normally open valve including a valve housing for engaging the opening in the cover plate and further including a complementary engagement surface for engaging the engagement surface on the cover plate so that the valve when installed on the cover plate is normally open during normal operation of an air turbine starter mounted on a gearbox.

29. The kit of claim 28 further comprising a second valve and wherein the cover plate includes a second wall defining a second opening for receiving the second valve.

30. The kit of claim 28 wherein the cover plate further includes a ring seal for sealing about an output shaft of an air turbine starter.

31. The kit of claim 30 further comprising a second valve and wherein the cover plate includes a second wall defining a second opening for receiving the second valve.

32. A method of operating an air turbine starter, the method comprising the steps of: operating an air turbine starter; allowing air transfer between the air turbine starter and a gearbox;
    keeping a fluid valve in the air turbine housing open under normal operating pressures inside an air turbine housing; and
    closing the fluid valve when the air pressure in the housing decreases below a defined pressure.

33. The method of claim 32 wherein the step of closing the fluid valve includes the step of reducing air flow between the air turbine starter and the gearbox.

34. The method of claim 32 wherein the step of keeping the fluid valve open includes the step of allowing air flow through the valve between the air turbine starter and the gearbox.

35. The method of claim 32 wherein the fluid valve is an air valve and the step of closing the fluid valve includes the step of closing the air valve.

36. An air turbine starter comprising an air turbine starter housing having a wall defining a first opening allowing oil to pass through the opening, an output shaft extending from the housing, a cover plate adjacent the output shaft and including a wall in the cover plate defining a second opening, a first normally open valve in the first opening, a second normally open valve in the second opening and wherein the first and second normally open valves are configured to be actuated by a pressure change across the valve.

* * * * *